United States Patent [19]

MacKichan

[11] Patent Number: 5,528,404
[45] Date of Patent: Jun. 18, 1996

[54] FAULT LOCATION IN OPTICAL SYSTEMS

[75] Inventor: John MacKichan, Suffolk, England

[73] Assignee: British Telecommunications public limited company, London, England

[21] Appl. No.: 182,042

[22] PCT Filed: Jul. 17, 1992

[86] PCT No.: PCT/GB92/01310

§ 371 Date: Feb. 28, 1994

§ 102(e) Date: Feb. 28, 1994

[87] PCT Pub. No.: WO93/02344

PCT Pub. Date: Feb. 4, 1993

[30] Foreign Application Priority Data

Jul. 18, 1991 [GB] United Kingdom ............... 9115453

[51] Int. Cl.$^6$ ............................................. H04B 10/08
[52] U.S. Cl. ...................... 359/110; 359/177; 359/179; 356/73.1
[58] Field of Search ........................... 359/174, 175, 359/177, 179, 173, 110; 355/24; 350/73.1

[56] References Cited

U.S. PATENT DOCUMENTS

| 5,013,907 | 5/1991 | Bateman | 356/73.1 |
|---|---|---|---|
| 5,083,874 | 1/1992 | Aida et al. | 385/24 |
| 5,093,568 | 5/1992 | Maycock | 356/73.1 |
| 5,214,728 | 5/1993 | Shigematsu et al. | 359/152 |
| 5,298,965 | 5/1994 | Spirit et al. | 356/73.1 |

FOREIGN PATENT DOCUMENTS

| 0331304 | 11/1993 | European Pat. Off. | H04B 10/16 |
|---|---|---|---|
| 60-177238 | 9/1985 | Japan | H04B 3/46 |

Primary Examiner—Leo Boudreau
Assistant Examiner—Rafael Bacares
Attorney, Agent, or Firm—Nixon & Vanderhye

[57] ABSTRACT

This invention relates to the use of Optical Time Domain Reflectrometry for locating fibre faults, e.g. breaks, in the transmission fibres associated with fibre amplifiers. Optical time Domain Reflectrometry measures the range to a fibre break by transmitting a pulse into the fibre. The returned signals are measured and timed and the timings are equivalent to a measurement of the range. In this invention, the laser pump used to drive the fibre amplifier is also used to generate the pulses to drive the Optical Time Domain Reflectrometry. This invention is particularly intended for use in the repeaters of a submarine telecommunications optical transmission system. These systems usually have a distress mode which is adopted in case of a malfunction, e.g. a broken fibre. The distress mode usually provides a channel for the transmission of distress information and the Optical Time Domain Reflectrometry information can be transmitted via this channel.

9 Claims, 1 Drawing Sheet

FAULT LOCATION IN OPTICAL SYSTEMS

FIELD OF THE INVENTION

This invention relates to the location of faults in optical telecommunications systems, especially to submarine systems.

BACKGROUND OF THE INVENTION

Optical submarine systems usually comprise cables which contain repeaters spaced at suitable intervals, e.g. about 50 km. Each cable contains several, e.g. 6 or 8 optical fibres which transmit the telecommunications traffic. In addition to the fibres, the cable usually contains a conductor to provide electrical power to the repeaters and strength elements, e.g. tensile wires, to increase its mechanical strength and to protect the fibres. Usually the tensile wires are in contact with the conductor so that the wires can assist in carrying the electrical current. The whole of the structure is enclosed in a waterproof sheath, usually polyethylene, which also provides electrical insulation. The cable usually has an annular structure with the fibres at the centre surrounded by the electrical conductor and the tensile elements and with the sheath on the outside. To give some idea of the dimensions, a typical cable has an overall diameter of 25 mm, the sheath is 5 mm thick, and the centre core, which contains all of the fibres, is usually about 2 mm thick. In shallow water, where cables are liable to be damaged by maritime operations such as fishing and dropping anchors, the structure described above may be contained inside armour.

The repeaters are needed because fibres attenuate signals whereby amplification is required at suitable distances. This invention is particularly concerned with repeaters in which the amplification is provided by a fibre amplifier. A fibre amplifier usually comprises a suitable length of fibre, e.g. 1–20 m, which contains a lasing additive such as a rare earth element. The fibre amplifier comprises a pump, e.g. a laser operating at 1480 nm, which produces a population inversion in the energy states of the lasing additive, whereby optical signals are amplified by laser action. The fibre amplifier usually includes an automatic gain control device (AGC) which monitors the strength of the amplified signals. The amplifier includes control means which adjust the power in the pump laser to maintain a constant signal level at the output. One method of improving the performance of the AGC comprises providing a control tone on the optical signals. The AGC detects the control tone and maintains its amplitude at a constant value. This technique guards against optical noise, e.g. from pumps, affecting the performance of the AGC.

It is possible that the optical cables described above may get damaged and, therefore, it is desirable to provide the system with a default mode which is adopted when the fibre is damaged. Clearly the breakage of a fibre means that no signals are transmitted through the break in the fibre and the amplifiers after the break receive no input. This implies that there is no amplified output or that the amplified output falls below a threshold level. Where a control tone is used the control tone falls below a threshold level. When low or no output is detected the system adopts a default condition. It should be noted that, because the conductor and the fibres represent a small filament in the centre of the cable, if any element is damaged it is usual that all the elements are damaged. Thus, although breakages are themselves unusual, when a breakage does occur, it usually affects all the systems of the cable. EP-0,331,304, (British Telecommunications) and its corresponding counterpart U.S. Pat. No. 4,995,100 describe a means of using an AGC (Automatic Gain Control) to amplify signals and also to detect the existence of breaks in cables. In that specification the AGC circuit responds to a control tone transmitted at a different frequency to the data signals. If the control tone drops below a predetermined threshold level the repeater then switches into distress mode. This will indicate either a break in the optical fibre or a failure of an amplifier.

JP60-177238 (Mitsubishi Electric Corp) also describes a method of transmitting a control tone at a different frequency to the data tones. The levels of the control tone and the data signal are compared by comparator means at the receiving station. Breakage of the fibre is detected by drop in intensity of the received signals.

When a cable breaks, conventional default systems, as will be described in greater detail below, are able to identify the repeater adjacent the break. However when repeaters are spaced at substantial distances, e.g. 50 km or more, recovery and repair work may be prolonged by the need to conduct marine operations to locate the break if it occurs between repeaters. It would facilitate marine operations if the distance from the repeater to the break could also be established. Because maritime recovery and repair operations involve substantial lengths of cable, e.g. up to 5 or 10 km, great precision is not needed, and it would be satisfactory if the break could be located to the nearest kilometer (i.e. an error of ±0.5 km). This can be achieved by transmitting a light pulse from an adjacent repeater to the break. The break reflects the pulse back to the repeater and measuring the total time enables the distance of the break to be estimated. Techniques in which a pulse is transmitted into fibre and returned signals are measured and timed are known by the generic name of Optical Time Domain Reflectometry which is conveniently shortened to OTDR. It has been proposed to use OTDR in repeaters in order to locate breaks. This invention relates to the application of OTDR to repeaters which contain optical amplifiers and one of the objects of the invention is to simplify the hardware.

SUMMARY OF THE INVENTION

According to this invention a laser which is used as a pump for the fibre amplifier during normal operation is used as a pulse generator for OTDR, e.g. during a default mode. It is also possible to employ other equipment normally present in a repeater for carrying out OTDR.

According to another aspect of this invention there is provided a Processor means for optical signals said processor means having an operational mode and a default mode, wherein said operational mode provides amplification for optical signals and said default mode provides Optical Time Domain Reflectrometry means for measuring the distance to a fibre break, said Optical Time Domain Reflectrometry means comprising means for transmitting an optical pulse into a fibre suspected of breakage and means for recording the intensity of radiation returned from said fibre and the time elapsed since transmission of said pulse, wherein said processor means comprises a fibre amplifier for amplifying optical signals by laser action and a pump laser for supplying pump radiation into said fibre amplifier to drive said operational mode and wherein said pump laser is also adapted to supply pulses into said fibre to drive said Optical Time Domain Reflectrometry means.

In addition to the equipment mentioned above OTDR requires suitable control means. This can be incorporated as a part of the control means which is normally present in a repeater including a fibre amplifier but enhancements are needed, e.g. additional programming and/or additional circuitry.

According to another embodiment of the invention a method of determining the location of a fault in an optical communications system which system comprises transmission fibre and repeaters comprising optical amplifiers for amplifying signals attenuated in said transmission fibre said amplifiers including pump lasers for providing pump radiation into fibres containing a lasing additive and said fault takes the form of a break in said transmission fibre; wherein said method includes an operational mode and a default mode wherein said operational mode comprises providing attenuated optical signals from said transmission fibre and pump radiation from said pump lasers into the amplifiers whereby the attenuated signals are amplified and switching to the default mode when an amplified signal falls below a predetermined threshold value; and wherein said default mode comprises generating Optical Time Domain Reflectrometry optical pulses from a pump laser used to provide pump radiation in the operational mode, transmitting said pulses into the transmission fibre and measuring the time elapsed and intensity of said pulses on return from said transmission fibre thereby to determine the location of a break in said fibre.

BRIEF DESCRIPTION OF THE DRAWINGS

The invention will now be described by way of example, with reference to the accompanying drawing which illustrates a fibre amplifier including an OTDR facility in accordance with the invention.

Figure 1:
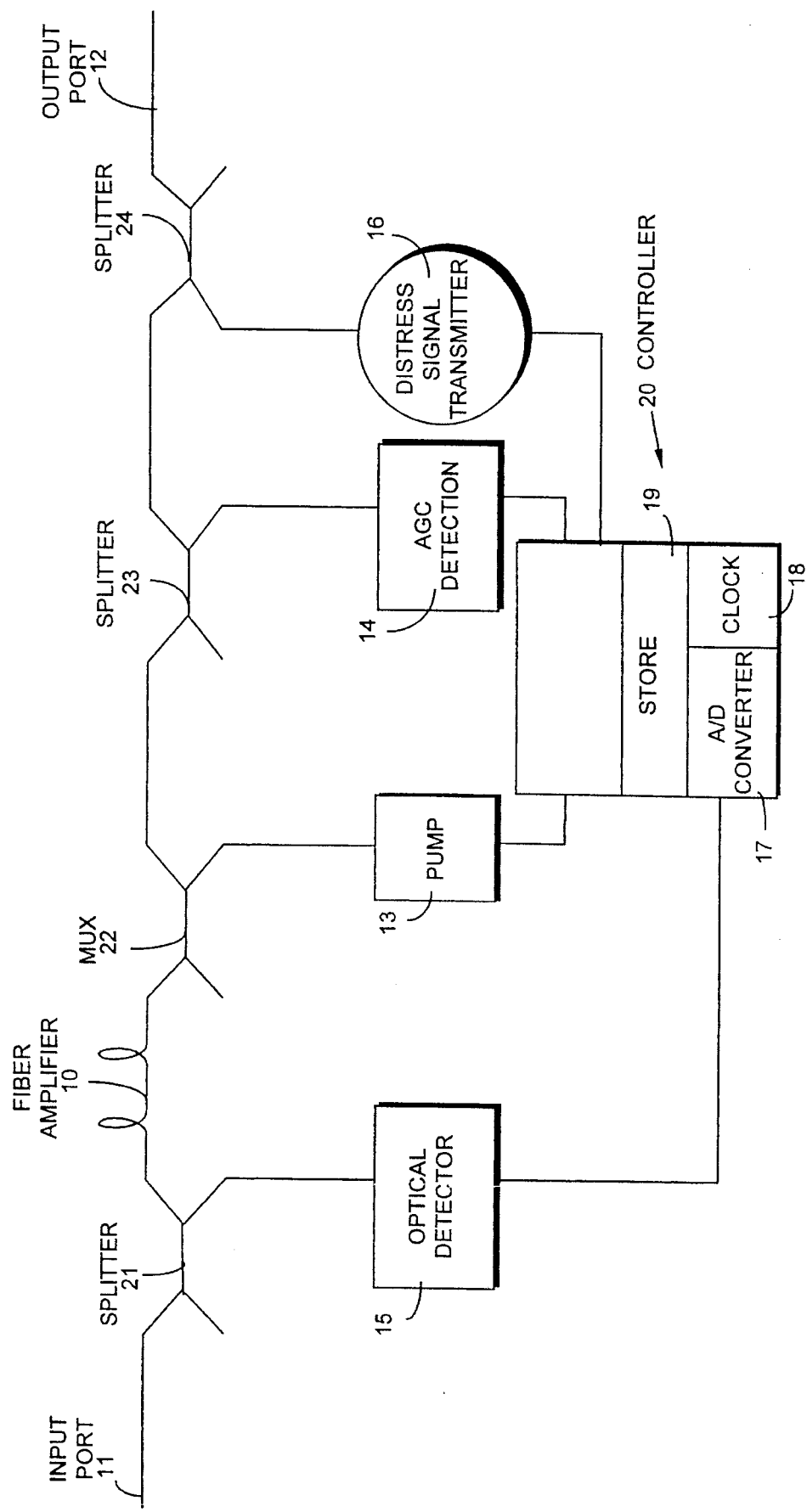
FIG. 1 shows a signal processor which, in accordance with the invention, provides.

(1) An operational mode for amplifying optical traffic signals at an operation wavelength, e.g. 1500 nm, and (2) A default mode which includes OTDR performed at an alternative wavelength, e.g. 1480 nm.

DETAILED DESCRIPTION OF THE DRAWINGS

The signal processor includes a fibre amplifier 10, e.g. 25 m of erbium doped fibre, which has an input port 11 and an output port 12. In use, the input port 11 is connected to transmission fibre (not shown) which conveys attenuated signals to the processor. Similarly the output port 12 is connected to transmission fibre (not shown) for the onward conveyance of amplified signals.

A pump laser 13 is operationally connected to the fibre amplifier 10 via a Wave Division Multiplexer WDM 22 for the supply of pump radiation at the alternative wavelength into the fibre 10. A splitter 23 is located between the WDM 22 and the output port 12. This splitter is adapted to pass 90% of the amplified signals to the output port 12 and 10% of the amplified signals to AGC detector 14. A controller 20, e.g. a microprocessor, is operationally connected to the pump laser 13 and the AGC detector 14 so as to provide automatic gain control to maintain the output of the fibre amplifier 10 at constant optical power. It will be appreciated that the components just described constitute a conventional fibre amplifier with AGC and its operational mode is conventional.

To provide the OTDR, the signal processor shown in FIG. 1 also includes an optical detector 15 for detecting the alternative wavelength. Preferably the detector 15 includes analogue integrating means. Optical detector 15 is connected to the input port 11 via a splitter 21. Splitter 21 is wavelength-sensitive so that detector 15 will receive the alternative wavelength but the operational wavelength will pass into the fibre amplifier 10 with the splitter 21 causing substantially (preferably no) attenuation. The output from detector 15 is connected to controller 20 which includes an A/D convertor 17, a clock 18 and storage means 19. As will be explained in greater detail below, the storage means 19 contains a plurality of separate storage locations, each of which is adapted to store a digitised signal strength relating to a particular time slot.

In order to transmit distress information, the signal processor also includes a distress transmitter 16 which is connected to the output port 12 via a WDM 24. The distress transmitter 16 is preferably a wide band LED (Light Emitting Diode) so as to ensure that at least a part of its output is matched to the optimum wavelength for transmission. The controller 20 is operationally connected to the LED 16 so that the controller 20 is able to transmit distress information through the system. The signal preferably conforms to the traffic specification whereby downstream signal processors are effectively informed that the fault lies upstream from the output port 12.

The OTDR will now be described in greater detail assuming a distance of 50 km between repeaters and a requirement to locate a fault to about ±0.5 km. 50 km is a realistic distance between repeaters and it will be appreciated that the distance between repeaters is determined by fundamental engineering and operational requirements. The OTDR has to work to whatever repeater spacing is selected. The accuracy of ±0.5 km is set by the requirement of marine operations, eg. to dredge up the cable in the event of a fault. The figure is based upon the accuracy of marine operations but OTDR can provide better accuracy. It is therefore convenient to adopt a higher standard in order to be sure that the minimum is achieved. It will also be appreciated that lower standards would be acceptable in most circumstances.

The higher standard stated above can be regarded as dividing the distance between repeaters into notional segments, each of which is 0.25 km long. At a spacing of 50 km this means that the fibre is divided into 200 such notional segments. It is the function of the OTDR to locate a break within one of these notional segments. Allowing for the refractive index of the glass it takes light about 250 microseconds to travel between repeaters. Since OTDR uses reflections, the time taken for a reflection to return to its starting point is about 500 microseconds for a range of 50 km. Since there are 200 notional segments the OTDR uses 200 time slots each of 2.5 microseconds duration. (A duration of 2.5 microseconds corresponds approximately to the time taken for light to traverse and return about 250 m of fibre length. For a refractive index of 1.4 the exact distance corresponding to a time slot of 2.5 microseconds is 268 m.)

The OTDR of the invention is carried out under the control of controller 20. Thus, the controller 20 causes pump laser 13 to emit a pulse of 2 microseconds at the alternative wavelength. This pulse is transmitted by the WDM 22, into fibre amplifier 10, to the splitter 21 and thence to the input port 11. Because the pulse is short (compared with continuous operation in the operational mode) the pump laser 13 can be operated at high power, eg. 150 W. Since the alternative wavelength is used for both OTDR and pumping the erbium in fibre amplifier 10 the fibre amplifier 10 will absorb some of the pulse. In addition the splitter 21 may also cause substantial attenuation. However, because the pulse has a high power, sufficient power passes to the input port 11. If desired, OTDR detector 15 may be disabled as the outward pulse passes.

The pulse passes into the transmission fibre which is connected to the input port 11 and it propagates along this fibre. It will be noted that the pulse is travelling in the opposite direction to the normal traffic. It will also be noted that the OTDR pulse outputs from the port which is normally used for receiving traffic. The pulse therefore travels upstream in the transmission fibre and it is reflected back from various irregularities and joints which are present in all forms of fibre. If the fibre is broken (and the OTDR is normally used to locate fibre breaks) there will be no reflection (ie. only noise) from beyond the break and the break itself will reflect a pulse of relatively high intensity.

The reflections occurring in the transmission fibre cause the return of radiation back to the input port 11 and, via the splitter 21, to the OTDR detector 15. The splitter 21 has directional as well as wavelength selective properties. Thus, in the outward direction, the OTDR pulse passes to the input port 11. However, in the return direction the reflected signals are passed to the OTDR detector with little or no attenuation. Because the splitter 21 is wavelength selective the above description only applies to the alternative wavelength. For the operational wavelength, the signals received at the input port 11 are passed to the fibre laser 10 without substantial attenuation.

The signals received by the OTDR detector 15 are passed to the controller 20 where they are digitised in the A/D convertor 17 and, every 2.5 microseconds as controlled by the clock 18, the samples are stored in storage means 19. Where OTDR detector 15 includes an analogue integrator the integrated value in each time slot is recorded. The integrator must be cleared in each time slot. The clock 18 is started when the OTDR pulse is transmitted and each digitised sample is stored in its own storage location corresponding to its time of receipt. Thus, each of said storage locations corresponds to one of the notional segments into which the transmission fibre has been divided. A storage location corresponding to a notional segment between the output port 12 and the break will contain a digitised signal value corresponding to the reflection properties of its segment. In the case of a storage location corresponding to a notional segment further away from the input port 11 than the break the stored value should be zero; if there is a value it will only represent noise which is very low in optical systems.

One of the storage locations will correspond to the notional segment in which the break occurred and this storage location will contain a substantial value because the break reflects the OTDR pulse. Once the signal values are stored in storage means 19 the controller 20 can locate the break by addressing each storage location in turn beginning with the storage location corresponding to the most distant segment. The first substantial value to be located identifies the location of the break and thus controller 20 can transmit this information using the distress LED 16. As an alternative the controller 20 can repeat the OTDR operation several times whereby an average value is stored in each of the storage locations. This makes the operation slightly more complicated but it will improve the accuracy of the OTDR. Clearly the repetitions must be spaced so as to allow time for every repetition. For example the time between OTDR pulses should be in excess of 500 microseconds.

A brief description of the complete operation of the signal process, including the conventional features, will now be given. In normal operation, the pump laser continuously provides pump radiation at the alternative wavelength into the fibre amplifier 10 in order to produce the inversion needed for lasing. Traffic signals are received at the input port 11 and it will be assumed that a conventional system is used in which the traffic signals are modulated not only with the on/off pulsing used to carry the traffic but also with a control tone which is sinusoidal at a frequency of, for example, 10 kHz. These signals, which are attenuated by passage through the transmission fibre, pass without substantial attenuation, via the OTDR splitter 21 to the fibre amplifier 10 where they are amplified by conventional laser activity. Approximately 90% of the amplified signals are delivered to the output port 12 where they are passed to transmission fibre. The remaining 10% of the amplified signals are passed by AGC splitter 23 to the AGC detector 14. The control tone is separated and its strength is measured. The controller 20 adjusts the power of the pump laser 13 so as to maintain the level of the control tone constant and this constitutes the (conventional) AGC of the system. (There is no control tone on the pump's wave length. This means that the pump's wave length cannot affect the AGC.) In the case of a fault, eg. if the transmission fibre connected to the input port 11 is broken, there will be no control tone at the AGC detector 14. When this level of control tone falls below a threshold value the controller 20 switches to the default mode. The controller will first carry out any programmed checks to ascertain that the circuitry of its own amplifier is in working order and, if a fault is located a code indicating the nature of the fault is transmitted by means of distress transmitter 16.

If no fault is discovered (or if no checking programme is provided), the controller 20 will initiate the OTDR procedure described above and the location of the break will be transmitted via distress transmitter 16.

The 10 kHz control tone will be superimposed upon the signals transmitted by the distress transmitter 16 and this means that downstream amplifiers will remain in the operational mode. The distress signals sent by the controller 20 include a digital code identifying the source of the message. Thus, the transmitted signals enable accurate location of the break because they identify the break by giving the distance in kilometers upstream of an identified transmitter.

It is important to realise that the OTDR is carried out in the opposite direction to the flow of traffic because any faults, eg. the total disappearance of all traffic, can only be detected by equipment located after the fault. It is also apparent that distress information must be transmitted away from the break because no transmission is possible across the break. Furthermore, it must be assumed that if one system is broken all the systems are broken. Therefore, the OTDR pulse is provided to the input port and the distress LED is connected to the output port.

The signal processing means described above is intended for use in telecommunications submarine repeaters. Submarine cables normally comprise several, eg. 6 or 8 fibre channels, and therefore each repeater normally contains a plurality of amplifiers, ie. one for each fibre. In addition, each repeater contains a power unit which is connected to the conductor of the submarine cable. This power unit provides power to all the equipment located in the repeater. While it is only necessary to provide OTDR in one of the fibre channels it is preferred to provide OTDR in every channel so that independent measurements of a break are obtained and the existence of a plurality of independent measurements gives added confidence to the result. It will also be realised that, although any one channel is unidirectional, the plurality of channels provides communication in both directions and OTDR measurements are obtained from two different repeaters located on opposite sides of the break. The fact that the measurements add up to the repeater distance provides additional confirmation that the OTDR is working correctly.

The preferred method of communicating distress information is via the distress LED 16 which has been described above. However, a person skilled in the art will be aware that there are many different ways of communicating distress information and the OTDR of the invention can use any of these methods. Another method of communicating this distress, telemetry and remote control information comprises superimposing modulated electrical signals on the power supply. This method can also be used in conjunction with OTDR according the invention.

It will be noted that the OTDR according to the invention demands very little extra in the way of hardware as compared with a conventional fibre amplifier including AGC and some means of distress signalling. The only extra equipment is the OTDR detector 15 and extra storage in the processor 20. In particular the number of time slots utilised is not of great importance since each time slot merely requires the provision of its own storage location. Information processing is the same for each time slot and, therefore, increasing the number of time slots and storage locations does not have much effect upon the programming. The only important difference is that a loop is repeated a greater number of times and this does not add to the complexity. Thus, the OTDR according to the invention provides a convenient means of more accurate location of fibre faults without increasing the complexity of the equipment in a submarine repeater to an unacceptable extent.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A repeater comprising processor means for optical signals said processor means having an operational mode and a default mode, wherein said operational mode provides amplification for optical signals and said default mode provides Optical Time Domain Reflectrometry means for measuring the distance to a fibre break, said Optical Time Domain Reflectrometry means comprising means for transmitting an optical pulse into a fibre suspected of breakage and means for recording the intensity of radiation returned from said fibre and the time elapsed since transmission of said pulse, wherein said processor means comprises a fibre amplifier for amplifying optical signals by laser action and a pump laser for supplying pump radiation into said fibre amplifier to drive said operational mode and wherein said pump laser also pulses into said fibre to drive said Optical Time Domain Reflectrometry means.

2. Processor means for optical signals said processor means having an operational mode and a default mode, wherein said operational mode provides amplification for optical signals and said default mode provides Optical Time Domain Reflectrometry means for measuring the distance to a fibre break, said Optical Time Domain Reflectrometry means comprising means for transmitting an optical pulse into a fibre suspected of breakage and means for recording the intensity of radiation returned from said fibre and the time elapsed since transmission of said pulse, wherein said processor means comprises a fibre amplifier for amplifying optical signals by laser action and a pump laser for supplying pump radiation into said fibre amplifier to drive said operational mode and wherein said pump laser also pulses into said fibre to drive said Optical Time Domain Reflectrometry means, an Automatic Gain Control (AGC) detector for measuring the intensity of amplified optical signals and an Optical Time Domain Reflectrometry detector for measuring the intensity of returned Optical Time Domain Reflectrometry radiation at an input of said fibre amplifier, said fibre amplifier being located between said AGC detector and said Optical Time Domain Reflectrometry detector; wherein said processor means also includes a controller which is operationally connected to said AGC detector and to said pump laser to provide automatic gain control by adjusting the power supply to said pump laser, and wherein said controller switches to a default mode when the intensity of amplified signals falls below a threshold value and, in said default mode, said controller causes said pump laser to transmit Optical Time Domain Reflectrometry pulses and said controller monitors the intensity and the time of detection of reflected signals as measured by said Optical Time Domain Reflectrometry detector.

3. A processor means according to claim 2 in which said pump laser transmits Optical Time Domain Reflectrometry pulses at a higher power to that used for data transmission.

4. A submarine repeater which includes at least one signal processor according to claim 1.

5. A submarine repeater according to claim 4, which includes an even number of said signal processors, half for processing signals in one direction and the other half for processing signals in the opposite direction.

6. A submarine cable system which includes a cascade of repeaters according to claim 4.

7. A method of determining the location of a fault in an optical communications system which system comprises transmission fibre and repeaters comprising optical amplifiers for amplifying signals attenuated in said transmission fibre said amplifiers including pump lasers for providing pump radiation into fibres containing a lasing additive and said fault takes the form of a break in said transmission fibre; wherein said method includes an operational mode and a default mode wherein said operational mode comprises providing attenuated optical signals from said transmission fibre and pump radiation from said pump lasers into the amplifiers whereby the attenuated signals are amplified and switching to the default mode when an amplified signal falls below a predetermined threshold value; and wherein said default mode comprises generating Optical Time Domain Reflectrometry optical pulses from the pump laser used to provide pump radiation in the operational mode, transmitting said pulses into the transmission fibre and measuring the time elapsed and intensity of said pulses on return from said transmission fibre thereby to determine the location of a break in said fibre.

8. A method according to claim 7 in which the pump laser which is normally used for transmission of data signals, operates in a default mode and operates at much higher power than when in the data transmission mode.

9. A method according to claim 7 which is used for determining location of faults in a submarine cable.

\* \* \* \* \*